United States Patent
Lendlein et al.

(10) Patent No.: US 7,217,744 B2
(45) Date of Patent: May 15, 2007

(54) POLYMERIC NETWORKS

(75) Inventors: Andreas Lendlein, Berlin (DE); Annette Schmidt, Neuss (DE); Nok Young Choi, Ludwigshafen (DE)

(73) Assignee: mnemoScience GmbH, Ubach-Palenberg (DE)

( * ) Notice: Subject to any disclaimer, the term of this patent is extended or adjusted under 35 U.S.C. 154(b) by 269 days.

(21) Appl. No.: 10/375,210

(22) Filed: Feb. 26, 2003

(65) Prior Publication Data

US 2003/0191276 A1    Oct. 9, 2003

(30) Foreign Application Priority Data

Feb. 26, 2002    (DE)    ................. 102 08 211

(51) Int. Cl.
  *C08G 63/08*    (2006.01)
  *C08L 67/07*    (2006.01)
  *C08L 33/08*    (2006.01)
  *C08F 2/46*    (2006.01)

(52) U.S. Cl. ............... 522/179; 522/182; 525/168; 525/174; 525/903

(58) Field of Classification Search ........... 522/182, 522/183, 179; 528/354, 355, 357, 361; 525/186, 525/168, 174, 903; 526/328, 328.5
See application file for complete search history.

(56) References Cited

U.S. PATENT DOCUMENTS

| | | | |
|---|---|---|---|
| 4,575,373 A | 3/1986 | Johnson | |
| 4,596,728 A | 6/1986 | Yang et al. | |
| 4,649,082 A * | 3/1987 | Friedlander | ......... 428/461 |
| 4,700,704 A | 10/1987 | Jamiolkowski et al. | |
| 4,804,733 A | 2/1989 | Bataille | |
| 4,816,094 A | 3/1989 | Pomplun et al. | |
| 5,049,591 A | 9/1991 | Hayashi et al. | |
| 5,108,755 A | 4/1992 | Daniels | |
| 5,128,197 A | 7/1992 | Kobayashi et al. | |
| 5,133,739 A | 7/1992 | Bezwada et al. | |
| 5,139,832 A | 8/1992 | Hayashi et al. | |
| 5,145,935 A | 9/1992 | Hayashi | |
| 5,189,110 A | 2/1993 | Ikematu et al. | |
| 5,410,016 A * | 4/1995 | Hubbell et al. | ......... 528/354 |
| 5,418,261 A | 5/1995 | Helsemans et al. | |
| 5,506,300 A | 4/1996 | Ward et al. | |
| 5,591,786 A | 1/1997 | Oxman et al. | |
| 5,635,545 A | 6/1997 | Oxman et al. | |
| 5,650,173 A * | 7/1997 | Ramstack et al. | ......... 424/489 |

(Continued)

FOREIGN PATENT DOCUMENTS

CN    1 271 742    11/2000

(Continued)

OTHER PUBLICATIONS

Lendlein et al, "AB-polymer Netwroks Based on Oligo(epsilon-caprolactone) Segments Showing Shape-Memory Properties", published on-line prior to Jan. 23, 2001.*

(Continued)

*Primary Examiner*—Susan Berman
(74) *Attorney, Agent, or Firm*—Pabst Patent Group LLP

(57) ABSTRACT

The present invention relates to polymeric networks, which are characterised by particular mechanical properties and which, furthermore, allow the control of thermal and mechanical properties by simple variation of the components.

26 Claims, 1 Drawing Sheet

Schematic representation of the network architecture
a)    Homopolymer
b)    Copolymer — Oligo[(ε-hydroxycaproate)-co-glycolate]-segments
~ Oligobutylacrylate-segments
⊙ Cross-linking points

U.S. PATENT DOCUMENTS

| | | | |
|---|---|---|---|
| 5,665,822 | A | 9/1997 | Bitler et al. |
| 5,665,831 | A | 9/1997 | Nuenschwander et al. |
| 5,765,682 | A | 6/1998 | Bley et al. |
| 5,776,162 | A | 7/1998 | Kleshinski |
| 5,800,516 | A | 9/1998 | Fine et al. |
| 6,160,084 | A * | 12/2000 | Langer et al. ............... 528/272 |
| 6,165,202 | A | 12/2000 | Kokish et al. |
| 6,388,043 | B1 | 5/2002 | Langer et al. |
| 6,730,772 | B2 * | 5/2004 | Shastri ....................... 528/354 |

FOREIGN PATENT DOCUMENTS

| | | |
|---|---|---|
| DE | 42 26 465 | 2/1993 |
| EP | 0 326 426 | 8/1989 |
| EP | 0 374 961 | 6/1990 |
| EP | 0 385 443 | 9/1990 |
| EP | 0 422 693 | 4/1991 |
| EP | 0 893 461 | 1/1999 |
| EP | 0 696 605 | 9/2000 |
| JP | 55065224 | 5/1980 |
| JP | 03068611 | 3/1991 |
| WO | WO 95/34331 | 12/1995 |
| WO | WO 98/14803 | 4/1998 |
| WO | WO 99/42147 | 8/1999 |
| WO | WO 99/42528 | 8/1999 |
| WO | WO 01/91822 | 12/2001 |

OTHER PUBLICATIONS

Cederstrom & Van Humbeeck, "Relationship between shape memory material properties and applications," *Journal de Physique IV* 5:C2-335-41 (1995).

Dagani, "Intelligent Gels," *Chemistry & Engineering News* 75:29-37 (1997).

Echigo, et al., "Development of a new transvenous patent ductus arteriosus occlusion technique using a shape memory polymer," *ASAIO Trans.* 36(3):M195-8 (1990).

Gordon, "Applications of Shape Memory Polyurethanes," *Proceedings of the First International Conference on Shape Memory and Superelastic Technologies, SMST International Committee*, pp. 115-119 (1994).

Hayashi, et al., "Properties and applications of polyurethane-series shape memory polymer," *ANTEC* 1998-2001 (1994).

He, et al., "Higher order structure and thermo-responsive properties of polymeric gel with crystalline side chains," *Polymer Journal* 28:452-7 (1996).

Hu, et al., "Synthesis and application of modulated polymer gels," *Science* 269:525-527 (1995).

Ito, et al., "Variation of free volume size and content of shape memory polymer-polyurethane-upon temperature studied by positron annihilation lifetime techniques and infrared spectroscopy," *J. Radioanalytical and Nuc. Chem.* 211:53-60 (1996).

Kagami, et al., "Shape memory behaviors of crosslinked copolymers containing strearyl acrylate," *Macromol. Rapid Commun.* 17:539-543 (1996).

Kim, et al., "Polyurethanes having shape memory effect," *Polymer* 37(26):5781-93 (1996).

Li, et al., "Shape memory gels made by the modulated gel technology," *J Appl Poym Sci.* 63:1173-78 (1997).

Li, et al., "Crystallinity and morphology of segmented polyurethanes with different soft-segment length," *J. Applied Polymer* 62:631-38 (1996).

Linge & Dahm, "Praktische aspekte der verwendung von superelastischen drahbogen in der edgewisetechnik," *Forschr. Kieferorthop* 55:324-329 (1994), Abstract only.

Monkman, "Advances in shape memory polymer actuation," *Mechatronics* 10:489-498 (2000).

Nakasima, et al., "Potential application of shape memory plastic as elastic material in clinical orthodontics," *Eur. J. of Ortho.* 13:179-186 (1991).

Sakurai, et al., "Crystal transformation of styrene-butadiene block copolymer," *Polymer* 35:4288-9 (1992).

Takahashi, et al., "Structure and properties of shape-memory polyurethane block copolymers," *J. Applied Polymer Science* 60:1061-69 (1996).

Tobushi, et al., "Mechanical properties of shape memory polymer of polyurethane series," *JSME International Journal Series I* 35:296-302 (1992).

Tobushi, et al., "Thermomechanical properties in a thin film of shape memory polymer of polyurethane series," *SPIE* 2716:46-57 (1996).

White & Ward, "Softenable, shape-memory thermoplastic for use in biomedical devices," *Mat. Res. Soc. Symp. Proc.* 110:635-640 (1989).

Lendlein, et al., "Hydroxy-telechelic copolyesters with well defined sequence structure through ring-opening polymerization," *Macromol. Chem. Phys.* 201: 1067-1976 (2000).

* cited by examiner

Schematic representation of the network architecture a) Homopolymer
b) Copolymer — Oligo[(ε-hydroxycaproate)-co-glycolate]-segments
⁓ Oligobutylacrylate-segments
⊕ Cross-linking points

POLYMERIC NETWORKS

This application claims priority to German patent application no. 102 08 211.1 filed on Feb. 26, 2002.

FIELD OF THE INVENTION

The present invention relates to polymeric networks, intermediate products, suitable for the preparation of the polymeric networks and processes for the manufacture of the intermediate products and the polymeric networks.

BACKGROUND OF THE INVENTION

Polymeric networks are used in a wide variety of fields in the art. In particular in recent years polymeric networks have attracted much attention which show inducible changes of the shape (shape-memory-properties), namely the so-called shapely-memory-polymers (SMP). Such SMP-materials are, for example, described in the applications WO99/42528 and WO99/42147. In view of the reversible change of shape, these materials are of high interest in a wide variety of fields, in which, for example, a change of the size is desired. This is, for example, true for medicinal implants, which desirably should only reach their final size after having reached the final destination, so that the introduction of these implants requires only minimal invasive chirurgical practices.

Although SMP-materials are already known in the prior art, these materials do show several drawbacks. A lot of SMP-materials, for example, lose their shape-memory-properties if the reversible change of shape is induced several times in several cycles. Furthermore, a lot of SMP-materials do not show the desired compatibility with tissue, required for the application in the medicinal field. Even the sometimes desired property of being biological degradable, for example, desired for some applications in the medical field, is sometimes not achievable. Furthermore, the know biodegradable SMP-materials do often show the undesired property, that the mechanical properties of the material change rapidly after having reached a certain threshold, although the degradation is not yet complete. A typical embodiment of this drawback is a strong embrittlement, which may cause problems in particular in the medical field, for example, when these materials are used as implants. Furthermore, a lot of the known SMP-materials are hard to modify with respect to desired thermal and mechanical properties.

It is therefore the object of the present invention to provide a SMP-material which overcomes the drawbacks of the SMP-materials known.

This object is solved with the polymeric network in accordance with claim 1. Preferred embodiments are defined in the sub-claims.

Furthermore, the present invention provides an intermediate product, suitable for the preparation of the polymeric network in accordance with the present invention. Finally, the present invention provides methods for the manufacture of the polymeric network and for the intermediate product. Preferred embodiments are again defined in the sub-claims.

DETAILED DESCRIPTION OF THE INVENTION

Figure 1:
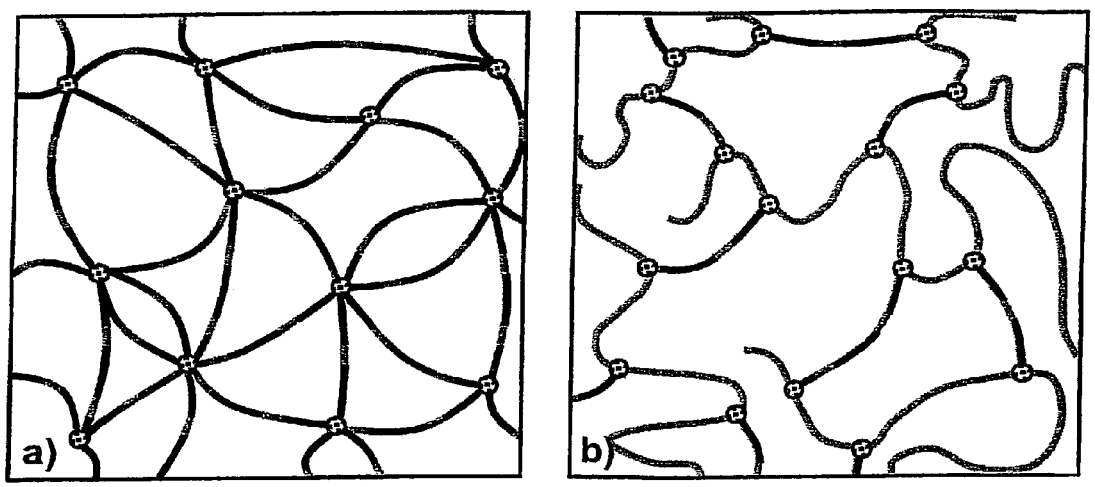
FIG. 1 shows a schematic representation of two embodiments of the present invention. The polymeric network of the present invention can be regarded as a network of copolyester segments, bonded or cross-linked at crosslinking units which are nearly crosslinking points. If a homonetwork is given (FIG. 1*a*) the copolyester segments are the only components of the network. If, however, a further component is present, preferably an acrylate component, the network comprises, in addition to the copolyester segments, further segments derived from the additional component (FIG. 1*b*).

The polymeric network, in accordance with the present invention, comprises as an essential component, copolyester segments, comprising units derived from glycolic acid (glycolate units). These copolyester segments comprise preferably from 5 to 70 weight % units, derived from glycolic acid. More preferred are 8 to 50 weight %, in particular, 10 to 30 weight %. These ranges are, in particular, preferred for copolyester segments which comprise, as additional component; caprolactone units. The preferred lactide containing copolyester segments which yield amorphous networks, the glycolic; acid content is again in the range of from 5 to 70 weight %, preferably 8 to 50 weight %, more preferably 10 to 30 weight %.

As further component the copolyester segments comprise units derived from other hydroxy carbonic acids, in particular, units derived from ε-caprolactone (caprolactone units) and/or lactic acid (lactide units).

The copolyester segments comprise preferably, units derived from glycolic acid, in the range defined above, as well as, units derived from ε-caprolactone or lactic acid, but no further units.

The copolyester segments of the polymeric networks of the present invention may be prepared by copolymerisation of the corresponding monomeric units using an initiator, preferably ethylene glycol. For the introduction of glycolate units, diglycolate is preferably used, which may be copolymerised with ε-caprolactone. In order to introduce lactide units, it is preferred to use LL-dilactide. Preferably, the reaction with ε-caprolactone is carried out in accordance with reaction (2), whereby an intermediate product of formula (1) is obtained:

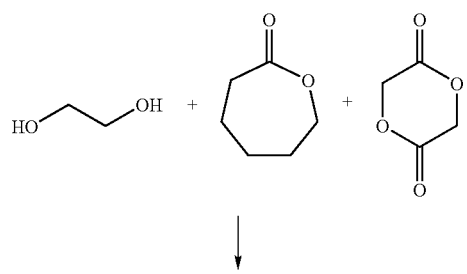

-continued

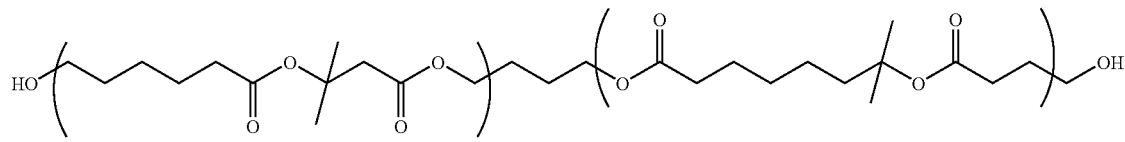

This reaction is preferably carried out in bulk, optionally using a catalyst, for example, dibutyl tin(IV)oxide. Without use of a catalyst, the distribution of the comonomers yields more or less blocky distributions, while the use of a catalyst yields a distribution resembling more closely a random distribution of the comonomers in the copolyester. Since most of the suitable catalysts, in particular, the compounds, are toxic the remaining catalyst in the copolyester has to be removed, in particular, if the copolyester segments are to be used in materials for medicinal purposes. The respective process conditions are known to the person skilled in the art and are illustrated in the following examples. The reaction using LL-dilactide is carried out in an analogous manner, yielding the intermediate product (1a) which corresponds to the intermediate product (1).

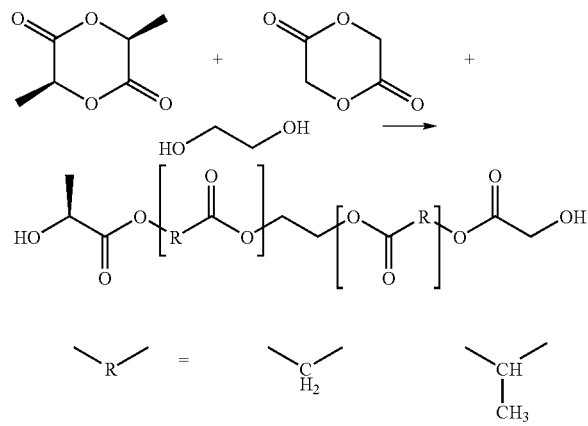

The intermediate products produced in accordance with this reaction are suitable, after proper functionalisation, for example, by introducing terminal acrylate groups, preferably methacrylate groups, for the preparation of the polymeric network of the present invention.

The copolyester segments which are contained in the polymeric network in accordance with the present invention do show preferably a distribution of caprolactone units and glycolate units yielding the following statistic number average values:

Number average of the caprolactone units (ZMCE) (average number of caprolactone units connected with each other up to the next glycolate unit): from 2 to 21, preferably from 2 to 8, in particular, preferably from 2.6 to 7.5.

Number average of glycolate units (ZMGE) (average number of glycolate units connected with each other up to the next caprolactone unit): from 1 to 4, preferably from 1 to 2, in particular, preferably from 1.1 to 1.3.

This distribution can be controlled by adapting the ratios of the monomers employed in the copolymerisation.

The copolyester segments of the polymeric network, in accordance with the present invention, if caprolactone units are present, preferably do show a number average molecular weight, determined by GPC, of from 2000 to 20000, preferably from 4000 to 15000 and, in particular, preferably from 8000 to 12000. If, however, lactide units are present, the number average molecular weight preferably is from 600 to 20000, more preferably from 1000 to 17500 and, in particular, preferably from 1100 to 10000. The molecular weight can be controlled during the copolymerisation of the starting monomers, since the length (i.e. the molecular weight) of the copolyester segments corresponds to the length of the intermediate products prepared in advance. The parameters necessary are known to the skilled person and are illustrated in the following examples. By varying the molecular weight, different crosslinking densities can be obtained. Uniform copolyester segments (i.e. small variability of the molecular weight) yield more uniform polymeric networks, which is preferred in order to obtain the desired reproducability of properties.

The production of the polymeric network, in accordance with the present invention, is preferably carried out using the intermediate products of formula (1) and (1a), respectively, after having been subjected to a suitable functionalisation. The functionalisation is preferably carried out by introducing terminal acrylate units, preferably using methacryloyl chloride, for example, in accordance with reaction (3), wherein K represents the main chain of the intermediate product:

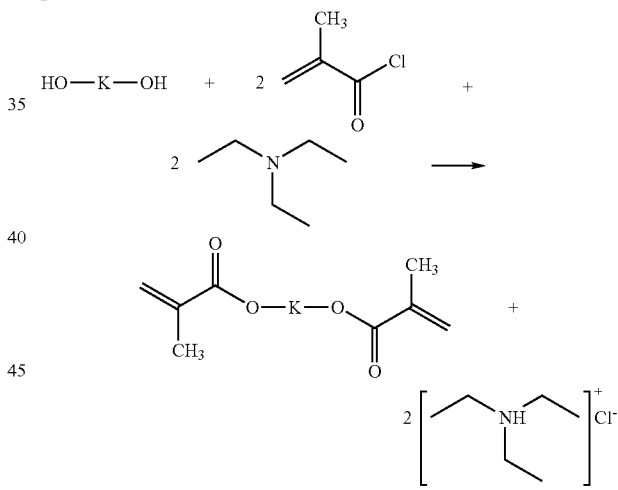

This reaction preferably is carried out in solution, for example, in a solution using THF as solvent. The necessary process parameters are known to the skilled person and are illustrated in the following examples. The reaction of lactide containing intermediate products of the formula (1a) is carried out analogously. The functionalisation in this manner yields macromonomers, suitable for the preparation of the polymeric networks in accordance with the present invention through subsequent crosslinking reactions. The degree of functionalisation, for example, the degree of methacrylisation when methacrylate groups are introduced, is preferably higher than 70%. Functionalisation with methacrylate typically gives degrees of methacrylisation of from 85–99%, a degree of methacrylisation of 100% represents the total functionalisation of the two terminals per molecule of the intermediate product. The intermediate product, thus functionalised, may be used for the preparation of the polymeric networks in accordance with the present invention. A certain content of intermediate products which are not completely functionalised is not detrimental. The intermediate products not completely functionalised yield, after the crosslinking reaction, lose chain terminals and oligomers not covalently bond to the polymeric network. Lose chain terminals as well as oligomers are not detrimental as long as their content is not unduly high. Degrees of functionalisation in the range of 70–100% are suitable for the preparation of polymeric networks in accordance with the present invention.

Crosslinking of the macromonomers after functionalisation preferably is carried out by irradiation with UV, initiating the reaction of the reactive, functionalised terminals. Since the macromonomers can be regarded as tetrafunctional a crosslinking may occur, yielding the polymeric networks of the invention, comprising the copolyester segments. Accordingly, a three dimensional, covalently crosslinked network is obtained, showing the above discussed crosslinking points.

If the crosslinking reaction, which is preferably carried out in a melt of the macromonomers, is carried out with the macromonomers only, the homopolymeric networks depicted schematically in FIG. (1a) are produced. A preferred embodiment of the present invention comprises the crosslinking reaction in the presence of an additional copolymerisable monomer. The use of the further copolymerisable monomers yields the production of segments of these further monomers, which are bonded covalently within the growing network. The network produced in this case is depicted schematically in FIG. (1b).

In addition to the copolyester segments the segments of the additional copolymerisable monomer are shown. Such networks may be designated AB-networks, comprising segments A of the additional polymer and segments B, corresponding to the copolyester segments.

The additional monomer is preferably selected among acrylate monomers, preferred in this connection are ethyl acrylate, n-butyl acrylate and hexyl acrylate, in particular n-butyl acrylate.

The additional monomer may be present in an amount of from 5 to 70 weight %, based on the final network, preferably in an amount of from 15 to 60 weight %. The introduction of varying amounts of additional monomer may be carried out by adding corresponding amounts of monomer to the mixture which is to be crosslinked. The introduction of the additional monomer into the network of the present invention is obtained in an amount, corresponding to the amount present in the mixture to be crosslinked. Specific parameters of the process are illustrated in the following examples.

The polymeric networks in accordance with the present invention, do show the following advantages, which are, based on the knowledge of the prior art, surprising.

The polymeric networks of the present invention do show good SMP properties, which are improved with respect to the known SMP-materials. The polymeric networks in accordance with the present invention do show a noticeable increased preservation of the SMP properties, even after multiple induction of the shape memory effect. Shape recovery and shape fixity, which may decrease with the known networks using caprolactone down to 85 to 90%, are, for the polymeric networks in accordance with the present invention, in particular for the networks using caprolactone units, 97 to 99%. The lactide containing polymeric networks do show values for shape recovery of from 85 to 99.7% and for shape fixity of up to 99.5%. Accordingly, the polymeric networks in accordance with the present invention do not show the strong decrease of the SMP properties characteristic for the materials known from the prior art.

At the same time, the variation of the amount of glycolate units enables a control of the temperature, which is designated transfer temperature, i.e. the temperature at which the polymeric networks of the present invention do show a change of shape. For the networks on the basis of glycolic acid and caprolactone, the transfer temperature may for example, be controlled within the range of from 20 to 50° C., depending on the amount of glycolate units and the amount of additional monomer, copolymerized during the crosslinking reaction of the macromonomers. These transfer temperatures, furthermore, are within a range enabling their application in the field of medicine, where transfer temperatures within the range of the usual body temperature are desired.

The use of basic units which are not toxic and biologically degradable, (caprolactone, lactide acid and glycolic acid) secures a good bio compatibility. The optional use of additional monomers, preferably n-butyl acrylate, enables a further control of the mechanical properties and the degradation properties of the polymeric networks in accordance with the present invention.

By varying the amounts of the components of the copolyester segments even the mechanical properties can be controlled. Networks on the basis of glycolic acid and Caprolactone, for example, may give values for E-module and elongation, determined at 70° C., of from 0.2 to 0.9 MPa and from 120 to 260% respectively, while the corresponding values, determined at 25° C., are 0.8 to 46 MPa and 200 to 480%, respectively. Networks comprising in addition, n-butyl acrylate (AB-networks) do show values of from 0.41 to 2.29 MPa and 63 to 142%, respectively, at 70° C., and 6.4 to 11 MPa and 271 to 422% at 25° C., respectively. Lactide containing networks, depending inter alia upon the molecular weight of the copolyester segments, show values for E-module and elongation at break of from 3 to 11 MPa and 50 to 200%, respectively.

The selection of the second component of the copolyester segment enables a further control of the mechanical properties. While the use of caprolactone units usually yields partially crystalline materials, for which the transfer between the different shapes is controlled thermodynamically, the use of lactide units yields a material in which the transfer is controlled kinetically. Accordingly, the transfer from temporary to permanent shape can, in principle, be carried out in infinite slow motion. Furthermore, polymeric networks with lactid units are transparent, below as well as above of the transfer temperature, which is of advantage for certain applications.

The possibility to control the length of the copolyester segments, furthermore, allows the preparation of polymeric networks having different crosslinking densities. The crosslinking, density enables the control of the strength of the polymeric networks, while the same time the glass transition temperature is maintained.

Accordingly, the polymeric networks of the present invention do provide a unit construction system enabling the well directed preparation of molecular architectures having a desired profile of properties using simple starting materials and simple reactions. The copolyester segments comprising glycolate units do serve as transfer segments for the shape memory properties.

Due to the above described properties, the polymeric networks in accordance with the present invention, are in particular suited for applications in the field of medicine, as implants, as temporary ligament augmentation, for the preparation of sustained release formulations as well as inter-vertebra disc replacement.

The present invention is described further by the following examples, which are intended as illustration only.

EXAMPLES

Preparation of Intermediate Products (Macrodiols)

Copolyesters of diglycolide and ε-caprolactone were prepared using ring opening polymerisation of the monomers in bulk. As initiator ethylene glycol was used. In some examples (05), (09), (11a), (13a), (18) Dibutyl tin (IV) oxide was used as catalyst. The starting monomers were purified prior to the polymerisation using usual procedures. The following Table shows the essential properties of the intermediate products prepared. $T_{m1}$ and $T_{m2}$ were determined by DSC and represent the local maxima in the DSC diagram.

| Example | Wt % Glycolate | Number Average Molecular Weight | ZMCE | ZMGE | $T_{m1}$ ° C. | $T_{m2}$ ° C. |
|---|---|---|---|---|---|---|
| (10) | 10 | 7600 | 21 | 3, 1 | 47 | 51 |
| (11) | 11 | 8300 | 11 | 3, 2 | 48 | 53 |
| (13) | 13 | 9300 | 9, 2 | 3 | 46 | 51 |
| (16) | 16 | 9700 | 8, 3 | 3, 6 | 50 | |
| (05) | 5 | | 7, 5 | 1, 1 | 44 | |
| (09) | 9 | | 5, 9 | 1, 1 | 39 | 43 |
| (11a) | 11 | 11000 | 4, 5 | 1, 1 | 37 | 42 |
| (13a) | 13 | 10600 | 3, 3 | 1, 2 | 28 | 37 |
| (18) | 18 | 11200 | 2, 6 | 1, 3 | 16 | 28 |

The presence of two adjacent maxima in the DSC diagram is an indication of the presence of crystallites having different thermodynamical stability.

Some of the intermediate products given above were provided with terminal methacrylic groups using methacryloyl chloride and a basic catalytic action with triethyl amine in THF at 25° C., employing reaction times of up to three days. The degree of methacrylisation was from 86 to 96% for the used intermediate products (05), (09), (11a), (13a), (18).

These macromonomers were then crosslinked at 70° C. using UV irradiation of 308 nm. The essential data for the polymeric networks are shown in the following Table. The mechanical properties were determined by stress-strain experiments. $T_g$ and $T_m$ designate the glass transition temperature and the melting temperature, $T_{trans}$ designates the shape memory transfer temperature, E the module of elasticity and $R_{r,ges}$ the total strain recovery value after five cycles. $R_{r,ges}$ was determined in accordance with published procedures for shape memory properties using a stress-strain apparatus.

| Example | $T_g$ | $T_m$ | E | $R_{r,ges}$ | $T_{trans}$ |
|---|---|---|---|---|---|
| (05) | −59 | 46 | 0, 97 | 99 | 43 |
| (09) | −55 | 39 | 0, 90 | 99 | 37 |
| (11a) | −56 | 37 | 0, 24 | 99 | 36 |
| (13a) | −52 | 30 | 0, 34 | 99 | 27 |
| (18) | −52 | 20 | 0, 45 | 99 | |

The macromonomers of examples (09) and (11a) were crosslinked in the presence of n-butyl acrylate. The other reaction conditions were identical. The following Table shows the essential data for the polymeric networks obtained.

| Example | Wt. % butyl acrylate in the network, determined by $^{13}$C-NMR | E-module MPa | Elongation at break |
|---|---|---|---|
| (09)B17 | 17 | 11 | 271 |
| (09)B28 | 28 | 8, 1 | 422 |
| (09)B41 | 41 | 6, 4 | 400 |
| (09)B56 | 56 | 6, 5 | 399 |
| (11a)B18 | 18 | 8, 8 | 372 |

The examples in accordance with the present invention do show that a simple variation of the molecular units of the polymeric networks enables the preparation of desired profiles of properties.

What is claimed is:

1. A shape memory polymeric network comprising an effective amount of copolyester segments derived from glycolic acid monomers, wherein the copolyester segments comprise up to 30 wt % of units derived from glycolic acid monomers, and wherein the total strain recovery value of the network after 5 cycles (Rr,ges) is from 85% to 99.7% and the shape fixity of the network is up to 99.5%.

2. The polymeric network of claim 1 wherein the copolyester segments are further derived from caprolactone monomers.

3. The polymeric network of claim 2 wherein the number average of the units derived from caprolactone monomers is between 2 and 21 and/or wherein the number average of the units derived from glycolic acid monomers is between 1 and 4.

4. The polymeric network of claim 2 further comprising monomeric units derived from acrylate.

5. The polymeric network of claim 4 wherein the acrylate is selected from the group consisting of ethyl acrylate, n-butyl acrylate, and hexyl acrylate.

6. The polymeric network of claim 5 wherein the acrylate is n-butyl acrylate.

7. The polymeric network of claim 1 wherein the copolyester segments are further derived from lactic acid monomers.

8. The polymeric network of claim 7 further comprising monomeric units derived from acrylate.

9. The polymeric network of claim 8 wherein the acrylate is selected from the group consisting of ethyl acrylate, n-butyl acrylate, and hexyl acrylate.

10. The polymeric network of claim 9 wherein the acrylate is n-butyl acrylate.

11. The polymeric network of claim 1 further comprising segments derived from acrylate monomers.

12. The polymeric network of claim 11 wherein the acrylate is selected from the group consisting of ethyl acrylate, n-butyl acrylate, and hexyl acrylate.

13. The network of claim 12 wherein the acrylate monomer is n-butyl acrylate.

14. The polymeric network of claim 11 wherein the concentration of acrylate is between about 5% and about 70% by weight of the final network.

15. The polymeric network of claim 1 wherein the copolyester segments derived from glycolic acid monomers comprise between about 10% and about 30% by weight glycolide.

16. The polymeric network of claim 1 wherein the copolyester segments have a number average molecular weight of between about 5000 and about 20,000 Daltons.

17. The polymeric network of claim 1, wherein the number average of units derived from glycolic acid range from 1 to 4.

18. A method for preparing a polymeric network comprising reacting an intermediate product of formula (1)

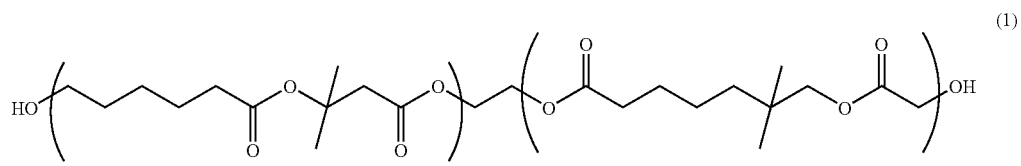 (1)

with methacrylic acid molecules to form a compound functionalized by the methacrylic acid molecules; and crosslinking the functionalized compound, optionally in the presence of an additional acrylate monomer, wherein the copolyester segments comprise up to 30wt % of units derived from glycolic acid monomers, and wherein the total strain recovery value of the network after 5 cycles (Rr,ges) is from 85% to 99.7% and the shape fixity of the network is up to 99.5%.

19. The method of claim 18 wherein the polymeric network comprises copolyester segments which comprise monomeric units derived from caprolactone.

20. The method of claim 18 wherein the polymeric network comprises copolyester segments which comprise monomeric units derived from lactic acid.

21. The method of claim 18 wherein the optional additional acrylate monomer is selected from the group consisting of ethyl acrylate, n-butyl acrylate, and hexyl acrylate.

22. The method of claim 21 wherein the acrylate monomer is n-butyl acrylate.

23. The method of claim 18 wherein the crosslinking is initiated by ultraviolet irradiation.

24. The method of claim 18 wherein the crosslinking occurs in the melt.

25. A shape memory polymeric network comprising an effective amount of copolyester segments comprising units derived from glycolic acid monomers and at least one other hydroxy carbonic acid monomer, wherein the copolyester segments comprise up to 30 wt % of units derived from glycolic acid monomers and wherein the number average of units derived from glycolic acid monomers ranges from 1 to 4.

26. The polymeric network of claim 25 wherein the at least one other hydroxy carbonic acid is selected from the group consisting of caprolactone monomers, lactic acid monomers, and combinations thereof.

* * * * *